(12) United States Patent
Bischoff

(10) Patent No.: US 10,358,102 B2
(45) Date of Patent: Jul. 23, 2019

(54) PROTECTIVE RADIATOR SHROUD FOR A MOTOR VEHICLE, AND MOTOR VEHICLE

(71) Applicant: AUDI AG, Ingolstadt (DE)

(72) Inventor: Andreas Bischoff, Lenting (DE)

(73) Assignee: AUDI AG, Ingolstadt (DE)

( * ) Notice: Subject to any disclaimer, the term of this patent is extended or adjusted under 35 U.S.C. 154(b) by 48 days.

(21) Appl. No.: 15/576,744

(22) PCT Filed: Oct. 31, 2016

(86) PCT No.: PCT/EP2016/001811
§ 371 (c)(1),
(2) Date: Nov. 24, 2017

(87) PCT Pub. No.: WO2017/129202
PCT Pub. Date: Aug. 3, 2017

(65) Prior Publication Data
US 2019/0143923 A1    May 16, 2019

(30) Foreign Application Priority Data

Jan. 28, 2016  (DE) ........................ 10 2016 000 945

(51) Int. Cl.
*B60N 99/00* (2006.01)
*B60R 19/52* (2006.01)
*B60R 13/10* (2006.01)

(52) U.S. Cl.
CPC ............ *B60R 19/52* (2013.01); *B60R 13/105* (2013.01); *B60R 2019/525* (2013.01)

(58) Field of Classification Search
CPC .. B60R 19/52; B60R 13/105; B60R 2019/525
See application file for complete search history.

(56) References Cited

U.S. PATENT DOCUMENTS

| 6,167,645 | B1 | 1/2001 | Gasko et al. |
| 6,540,275 | B1 * | 4/2003 | Iwamoto ................. B60R 19/12 293/109 |
| 2006/0059735 | A1 | 3/2006 | Yeo |
| 2007/0182171 | A1 * | 8/2007 | Kageyama ............. B60R 21/34 293/102 |
| 2015/0353030 | A1 | 12/2015 | Walters |
| 2016/0039379 | A1 * | 2/2016 | Saitoh .................... B60R 19/18 293/117 |

FOREIGN PATENT DOCUMENTS

| DE | 102005033873 A1 | 1/2007 |
| DE | 202013001190 U1 | 5/2013 |

(Continued)

OTHER PUBLICATIONS

PCT (Written Opinion) dated Dec. 19, 2016 from corresponding International Application No. PCT/EP2016/001811 (5 pages).

(Continued)

*Primary Examiner* — Lori L Lyjak
(74) *Attorney, Agent, or Firm* — Maier & Maier, PLLC

(57) ABSTRACT

A protective radiator shroud for a motor vehicle that is provided with a receiving area for a license plate holder and with a license plate holder. A deformable, plate-shaped energy absorber is arranged between the receiving area of the protective radiator shroud and the and the license plate holder.

5 Claims, 2 Drawing Sheets

(56) References Cited

FOREIGN PATENT DOCUMENTS

Figure 1:
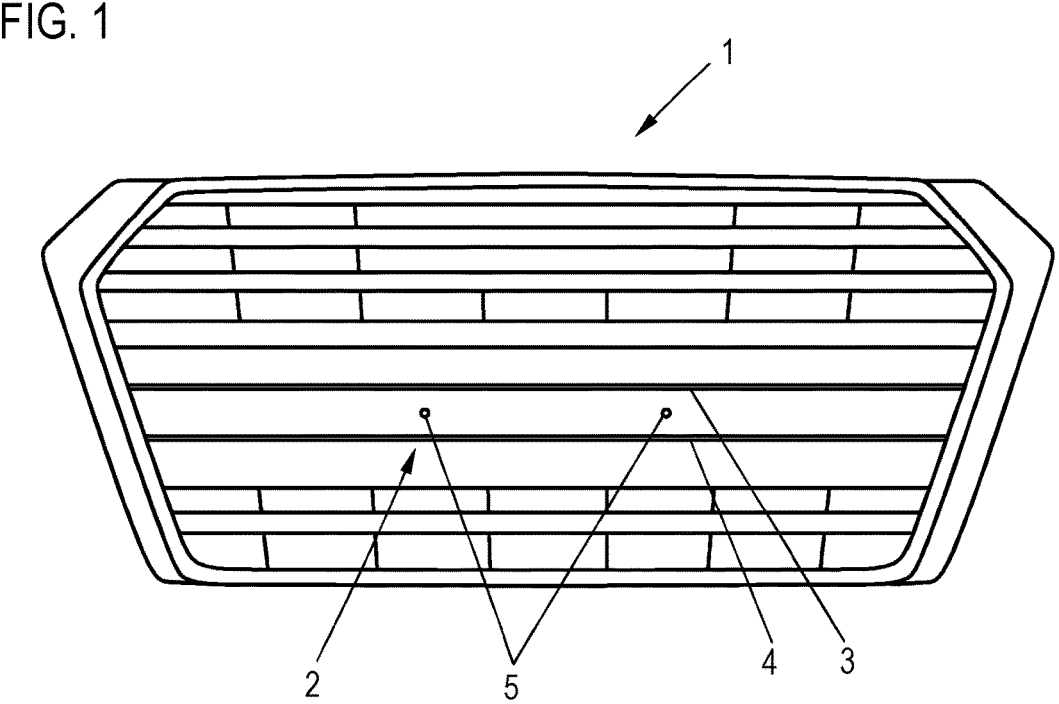

GB          2401233 A     11/2004
KR     20070034356 A      3/2007

OTHER PUBLICATIONS

German Examination Report dated Dec. 19, 2016 from corresponding German Application No. DE 10 2016 000 945.4 (10 pages).
International Search Report (with English translation) dated Dec. 19, 2016 from corresponding International Application No. PCT/EP2016/001811 (2 pages).
Notification of Transmittal of Translation of the International Preliminary Report on Patentability dated Aug. 9, 2018, including the Written Opinion of the International Searching Authority, in connection with corresponding International Application No. PCT/EP2016/001811 (6 pgs.).

* cited by examiner

PROTECTIVE RADIATOR SHROUD FOR A MOTOR VEHICLE, AND MOTOR VEHICLE

FILED

The invention relates to a protective radiator shroud for a motor vehicle comprising a receiving area for a license plate holder and a license plate holder.

BACKGROUND

The term "protective radiator shroud", used in the present application, comprises radiator grills that are arranged on the front side of a motor vehicle, preferably in front of a radiator. A protective radiator shroud can be in particular formed as a protective radiator grid which is provided with horizontal and/or vertical ribs. A protective radiator grid can be also provided with any arrangement of through-openings, by means of which for example a honeycomb structure is formed.

A protective radiator grid for a motor vehicle comprises as a rule a plurality of air inlets and it is arranged in a front region of a motor vehicle. The protective radiator shroud usually comprises at least one air-guiding element, which is arranged parallel or orthogonally to the transverse direction of the motor vehicle in order to guide an air stream in the longitudinal direction of the motor vehicle from the front region of the motor vehicle to a radiator located behind the radiator grid.

Usually, the protective radiator grid comprises at least a partially flat receiving region for the license plate holder that is used for holding a license plate of the motor vehicle, wherein the license plate holder can be attached with a fastening means to the protective radiator grid.

In the case of a frontal collision of the motor vehicle, for example with a pedestrian, an impact occurs as a rule in the area of the protective radiator grid. For this reason, the protective radiator grid is of particular importance with respect to protection of pedestrians. That is why its construction, geometry, material and its composition are selected in such a way so that a collision with a pedestrian would cause a reduced risk of injury to the pedestrian.

The document KR 20070034356 A describes a license plate holder provided with an impact-absorbing element. The impact-absorbing element is arranged in such a way that a deformation of a license plate held by a license plate holder is prevented.

The objective of the invention is therefore to specify an improved protective radiator shroud which makes it possible to minimize the effects of a collision of the motor vehicle with a pedestrian.

In order to achieve this objective with a protective radiator shroud of the type described in the introduction according to the invention, a plate-shaped deformable energy absorber is arranged between the receiving region of the protective radiator shroud and the license plate holder.

The protective radiator shroud according to the invention can be arranged on a motor vehicle for example in the front region and thus in a zone of the motor vehicle protecting pedestrians, so that in addition to the plate-shaped deformable energy absorber, it is provided also with a passive safety element. Behind the protective radiator shroud can be arranged for example impact absorbers, which can fully cushion in a resilient manner an impact at a low speed. With the protective radiator shroud according to the invention, the forces that are caused by an impact can be transmitted to the safety elements located in the back, such as for example to the entire plate-shaped energy absorber of the shock absorber.

The plate-shaped energy absorber can be deformed in case of an impact of the motor vehicle by a force acting on the motor vehicle. As a result, a cavity created between the license plate holder that is placed on the protective radiator shroud and the protective radiator shroud can be used to compensate at least partially for the force acting as a result of an impact. Therefore, in addition to preventing premature collapsing of an unstable license plate holder, the vehicle is protected against a fixed object, for example during the operation when the motor vehicle is being parked or when it is exiting a parking space at a low speed.

The energy absorber can be held by a holding device at the rear side of the license plate holder. The holding device can be for example realized by means of at least one hook and/or at least one latching connection. The latching connection can be in this case designed in such a way that it can be released as required and so that the energy absorber is exchangeable. The latching connection can consist of two parts, wherein one part can be provided with a spherical head and another part can be provided with a spherical socket, so that a snap-in connection is created, which can be engaged by a movement under pressure of the spherical head into the spherical socket. The latching connection can be released again with a force acting opposite the latching movement.

According to the invention, the receiving area of the protective radiator shroud, of the energy absorber and of the license carrier can be provided with openings for fastening means. The openings can be provided for example with the same diameter and they can be arranged in such a way that an inserted fastening means penetrates at the same time through the license holder, as well as through the energy absorber and the protective radiator shroud. The license plate holder, the energy absorber and the protective radiator shroud can be therefore respectively provided with an opening and they can be connected to each other with a fastening means. According to the invention, several openings and fastening means can be provided as an alternative on the license plate holder, on the energy absorber and on the protective radiator shroud in order to connect the three elements to each other.

For example, the energy absorber can be fastened to the protective radiator shroud with at least one fastening means. The license plate holder can be fastened with at least one additional fastening means to the energy absorber.

According to the invention it can be provided that the energy absorber is fastened with at least one fastening means to the protective radiator shroud as in the case of the previous example. On the other hand, the license plate holder can be fastened with at least one fastening means also to the protective radiator shroud. For a fastening means can be used within the context of the present invention a screw or a threaded bolt in conjunction with a nut. As an alternative, the fastening means can be designed as a latching connection.

The license plate holder arranged on the protective radiator shroud can protrude beyond the edge of the energy absorber, which is arranged so that it is covered between the protective radiator shroud and the license plate holder, and the energy absorber can be arranged on the protective radiator shroud. Due to the fact that the license plate holder is protruding beyond the edge of the energy absorber, the energy absorber can be framed by the license holder in such a way that the energy absorber will be arranged so that it will not be visible between the license plate holder and the protective radiator shroud.

According to the invention it can be provided that the edge of the license plate holder protrudes along the entire extent of the energy absorber. However, according to the invention it is also possible that the edge of the license holder does not protrude over the edge of the energy absorber in all the locations. For example, the edge of the license plate holder can protrude at the upper edge and at both lateral edge beyond the edge of the energy absorber.

The energy absorber can consist of a polypropylene foam. Polypropylene foam (EPP) is a mainly closed-cell foam substance (EPP), wherein polypropylene foams having different hardness and/or density can be used in accordance with the invention.

The protective radiator shroud can be designed in particular as a protective cooling grid and it can be provided with at least one horizontal rib, wherein the energy absorber can be deployed opposite the horizontal rib. The protective cooling grid can be also provided for example with a plurality of ribs and/or vertical ribs. The thickness of the energy absorber can be selected in such a way that the energy absorber has a determined thickness even in the region located opposite the rib of the protective cooling grid. The elements of the protective cooling grid, which in contrast to the energy absorber and the license holder are relatively hard, are thus mutually separated from each other over the entire surface of the energy absorber, wherein the distance is between them is predetermined by the thickness of the energy absorber in the respective location.

The invention additionally also relates to a motor vehicle having at least one protective radiator shroud according to the invention. The protective radiator shroud can be installed according to the invention in the front region of the motor vehicle.

BRIEF DESCRIPTION

Figure 2:
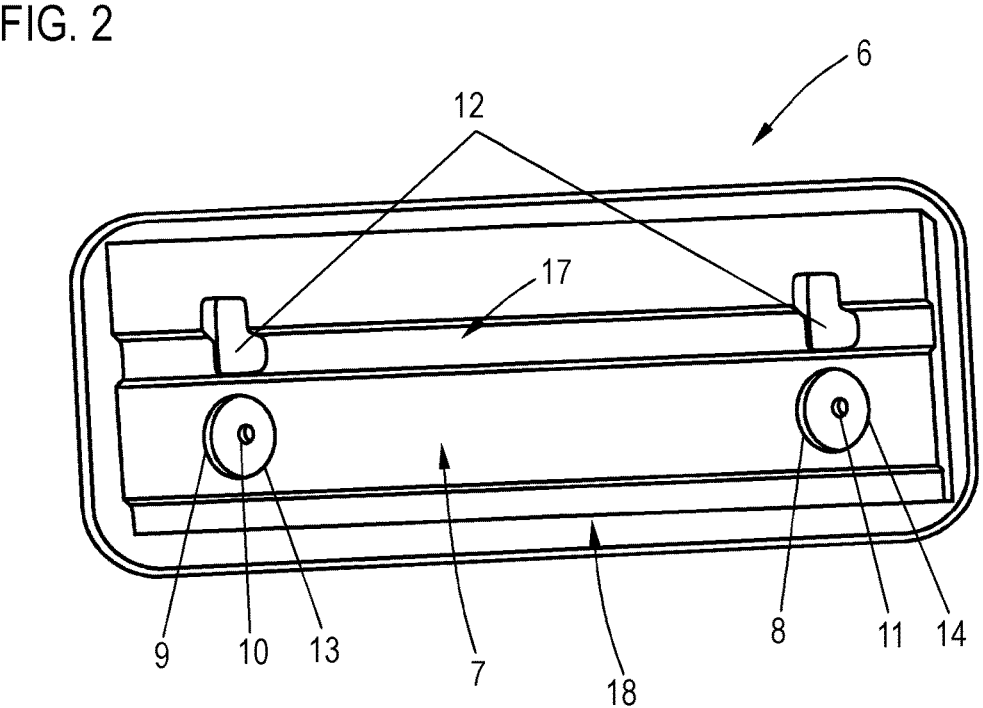
Figure 3:
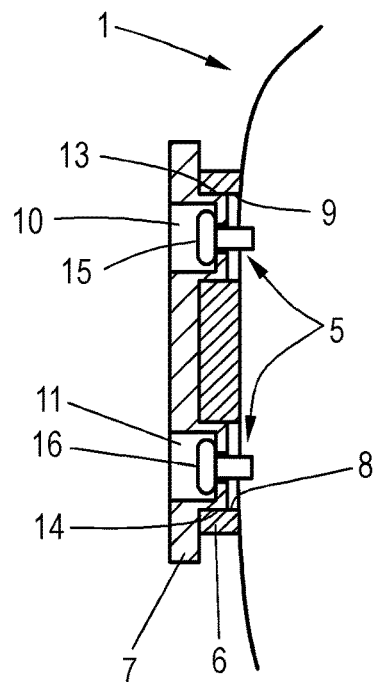
Figure 4:
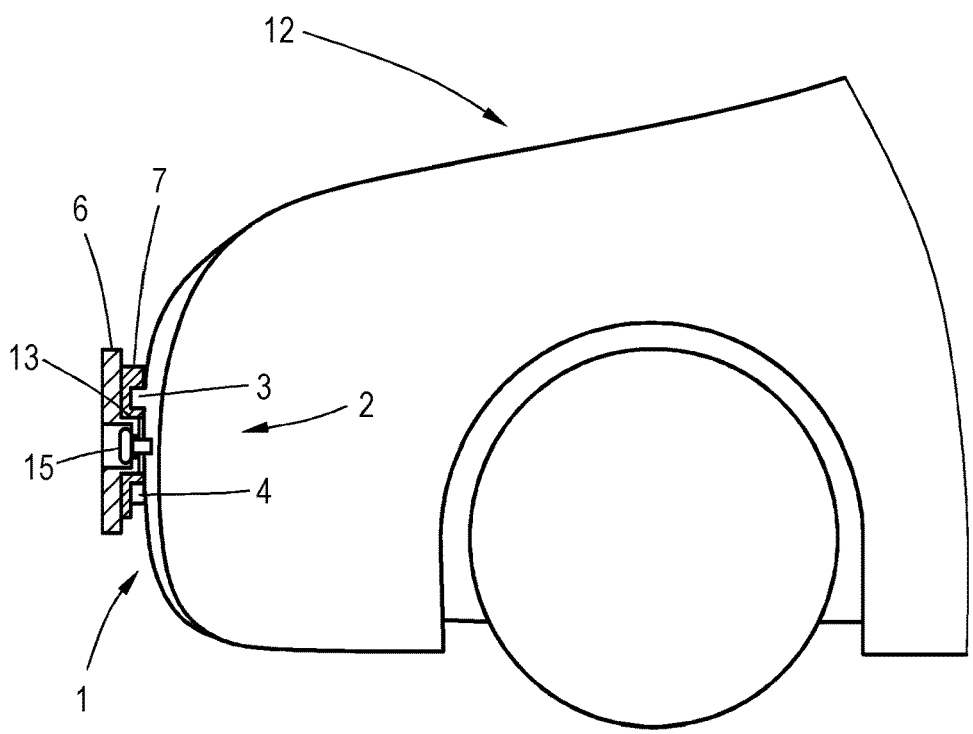

Further advantages and details of the invention will become apparent from an embodiment described with reference to the attached figures. The figures are schematic representations which show the following:

FIG. 1 an illustration of a protective radiator shroud according to the invention in a front view;

FIG. 2 a detailed lateral view of a license plate holder;

FIG. 3 the protective radiator shroud of FIG. 1 in a sectional top view;

FIG. 4 the protective radiator shroud according to the invention in a lateral sectional view.

DETAILED DESCRIPTION

FIG. 1 shows a protective radiator shroud 1 with an end region and a plurality of honeycombs, which are formed with horizontally and vertically arranged ribs. An air stream, which impacts the protective radiator shroud 1, is guided by means of these ribs in such a way that it is directed to a radiator arranged behind the protective radiator shroud. A receiving region 2, which is arranged on the protective radiator shroud 1, is used for attaching the vehicle license holder to the protective radiator shroud 1. The receiving region 2 is located between two horizontal ribs 3, 4 so that it forms a continuous surface. As an alternative, a receiving area can be provided also above the rib 3 and/or under the rib 4. In the receiving area 2 are arranged two openings 5 which are used for the attachment of two fastening means on the protective radiator shroud 1.

FIG. 2 shows a vehicle license plate holder 6, which is attached at a mounting position. FIG. 2 shows the side facing the protective radiator shroud 1 (rear side) in the mounting position of the license plate holder 6. On this side of the license plate holder 6 is arranged a plate-shaped energy absorber 7, which is held by a hook-shaped holding element 12 and by means of a form-fitting connection on the receptacles 13, 14 on the license plate holder 6. Two openings 10, 11 are arranged on the license plate holder 6 in such a way that two circular openings receptacles 13, 14 are protruding from the surface of the license plate holder 6. When the fastening means are inserted from the opposite side into the license plate holder 6, they are inserted into the projecting receptacles 13, 14 which are directed toward the protective radiator shroud. The plate-shaped energy absorber 7 is provided with two circular recesses 8, 9 at the locations of the protruding receptacles 13, 14 of the license plate holder 6. The edge of the license plate holder 6 protrudes in each location beyond the edge of the energy absorber 7, so that the energy absorber is in the mounted state of the protective radiator shroud 1 covered by the energy absorber 7 and the license plate holder 6 so that it cannot be seen through the license plate holder 6.

As can be seen in FIG. 2, the figure shows a groove 17 created on the lower edge of the energy absorber 7 and a recess that is created for ribs 3, 4 formed as shown in FIG. 1 counter-formed to the energy absorber 7. This groove 17 and recess 18 extend over the entire length of the energy absorber 7. However, only one part of the thickness of the energy absorber 7 is recessed in the regions of the groove 17 and of the recess 18. Since the groove 17 and the recess 18 are counter-formed in the opposite regions of the energy absorber 7 to the horizontal ribs 3, 4 of the protective radiator shroud 1, the remaining thickness of the energy absorber 7 is used to ensure in these regions that energy absorption through deformation of the plate-shaped energy absorber 7 is possible also in these regions.

FIG. 3 shows a schematic view of the protective radiator shroud 1 in a sectional top view, which illustrates in detail the arrangement of the protruding receptacles 13, 14 of the license plate holder 6. Two fastening means 15, 16 that are constructed as screws penetrate through the openings 10, 11 of the license plate holder 6 and they are arranged recessed in protruding receptacles 13, 14 of the license plate holder 6. The fastening means 15, 16, which are protruding all the way into the protective radiator shroud 1, are integrated in a fixed manner by being screwed into the dome (not shown) that is made of a plastic material. With the energy absorber 7, which is made in the shown embodiment of a very rigid plastic material, the energy is punctually directed so that it is distributed in a planar manner to pass through a test body or through a body part of a pedestrian, for example a leg.

FIG. 4. is a sectional lateral view of the protective radiator shroud 1. It can be clearly seen in this lateral view that the receiving region 2 is located between the two ribs 3, 4, which are deployed horizontally and protruding in the forward direction. The protective radiator shroud 1 is mounted in the front region of a motor vehicle 12. As shown in FIG. 4, the plate-shaped energy absorber 7 is counter-formed at a plurality of points of the protective radiator shroud 1, wherein it is also formed in the frame of the protruding receptacles 13, 14 of the license plate holder 6 because a circular recess is created in this location over a part of its thickness.

The invention claimed is:

1. A protective radiator shroud for a motor vehicle, comprising:

a receiving region for a license plate holder and a license plate holder, wherein between the receiving region of the protective radiator shroud and the license plate holder is arranged a deformable, plate-shaped energy absorber, wherein the energy absorber includes at least one groove and at least one recess extending over an entire length of the energy absorber, wherein the at least one groove and at least one recess are each counter-formed to one or more ribs of the protective radiator shroud.

2. The protective radiator shroud according to claim 1, wherein the energy absorber is clamped by a holding device at the rear side of the license plate.

3. The protective radiator shroud according to claim 1, wherein the receiving area, the energy absorber and the license plate holder are provided with openings for a fastener.

4. The protective radiator shroud according to claim 1, wherein the license plate holder arranged on the protective radiator shroud protrudes beyond an edge of the energy absorber between the protective radiator shroud and the license plate holder and covers the energy absorber between the protective radiator shroud and the license plate holder.

5. The protective radiator shroud according to claim 1, wherein the energy absorber consists of a polypropylene foam.

* * * * *